United States Patent [19]

Jones

[11] 4,383,840

[45] May 17, 1983

[54] DUST COLLECTOR WITH TUBULAR BAG AND CAGE FILTERS AND BEATER RODS

[76] Inventor: Donald W. Jones, P.O. Box 1329, Sylacauga, Ala. 35150

[21] Appl. No.: 315,977

[22] Filed: Oct. 28, 1981

[51] Int. Cl.³ ............................................. B01D 46/04
[52] U.S. Cl. ...................................... 55/283; 55/299; 55/300; 55/304
[58] Field of Search ................. 55/283, 284, 296, 297, 55/300, 304, 341 R, 379; 210/388, 413, 785

[56] References Cited

U.S. PATENT DOCUMENTS

| | | | |
|---|---|---|---|
| 1,118,044 | 11/1914 | Playter | 55/300 |
| 2,503,568 | 4/1950 | Timm | 55/304 |
| 3,407,572 | 10/1968 | Tolley | 55/283 |
| 3,447,289 | 6/1969 | Pegg | 55/300 |
| 3,747,307 | 7/1973 | Peshina et al. | 55/341 R |
| 4,152,127 | 5/1979 | Kennedy, Jr. | 55/304 |
| 4,306,893 | 12/1981 | Fernando et al. | 55/379 |

FOREIGN PATENT DOCUMENTS 770518 10/1980 U.S.S.R. ................................ 55/304

*Primary Examiner*—David L. Lacey
*Attorney, Agent, or Firm*—Mason, Fenwick & Lawrence

[57] ABSTRACT

A plural bag dust collector filter apparatus for filtering air to remove dust and similar contaminants therefrom including a plurality of vertically elongated tubular cylindrical upwardly opening filter bags and respective associated shape-maintaining skeletal cylindrical wire cages inwardly lining the filter bags arranged in transversely plural longitudinal rows of plural filter bags each in a box-like chamber, and a shake-down mechanism comprising vertically elongated beater rods located respectively within and depending substantially throughout the vertical height of the respective filter bag cages and their associated filter bags. Rotatable crank arms pivotally coupled to the opposite ends of supporting bars for the beater rods and a powered drive therefor are provided to impact the beater rods inwardly against their associated cages and develop sufficient force to dislodge dust build-up on the surfaces of the filter bags.

2 Claims, 8 Drawing Figures

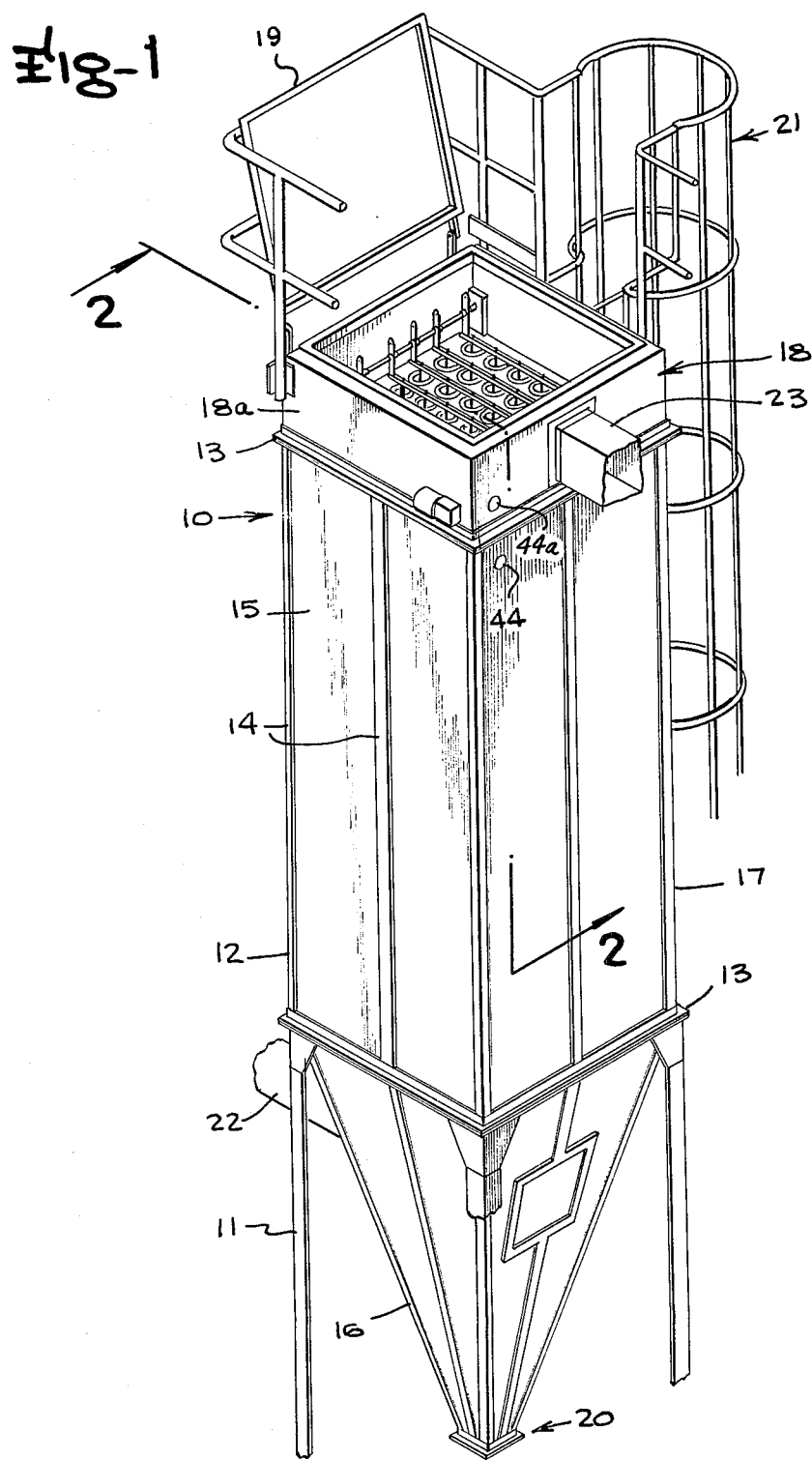

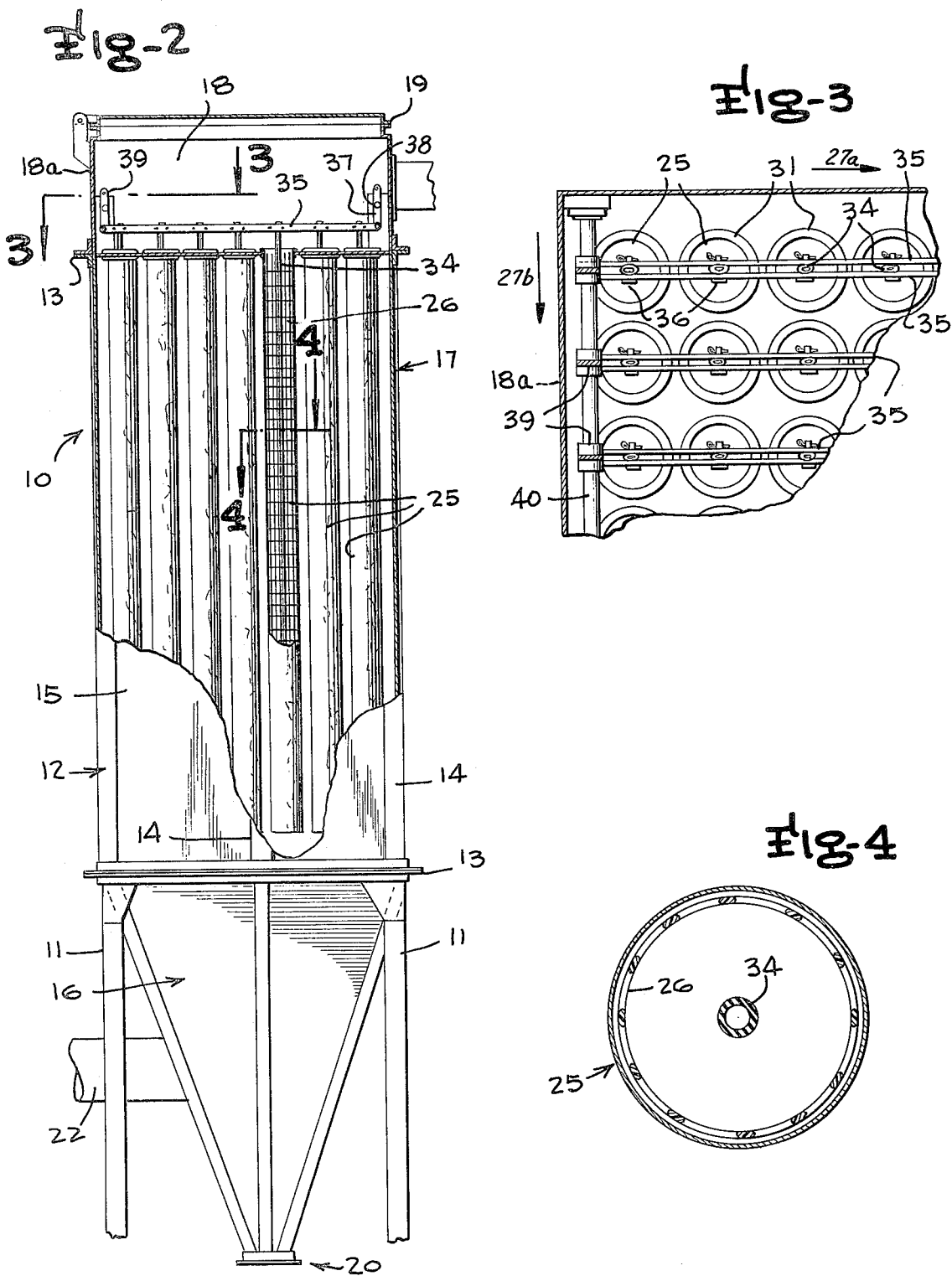

DUST COLLECTOR WITH TUBULAR BAG AND CAGE FILTERS AND BEATER RODS

BACKGROUND AND OBJECTS OF THE INVENTION

The present invention relates in general to dust collectors, and more particularly to dust collector devices in the form of plural bag filters designed to filter air in a working environment and remove dust therefrom, and wherein means for activiating a mechanical shake-down mechanism to dislodge dust from the filter bag dust collecting surfaces is automatically activated responsive to sensing of static pressure differentials above a preselected level.

Heretofore, a number of different types of dust collectors involving plural bag or plural tube filter mechanisms and dust dislodging devices have been proposed for dust collectors designed to remove dust from the air of working spaces in a factory and the like. These generally have taken the form of mechanical shake-down machines, pulse jet collectors, and reverse jet collectors associated with plural dust collecting tube or bag filter mechanisms.

In most mechanical shake-down devices heretofore employed to dislodge dust from the filter media, such as filter bags or filter tubes, the devices have been cycled to clean the filter media, usually only when the collector has been stopped from operating. The cleaning mechanism usually only operates at programmed shut-downs, or at the end of the day. This causes a higher dust loading on the filter bags or filter tubes because of the long periods of operation without a purge action interceding in the dust build-up. In turn, a mechanical collector of this type has to be designed with greater cloth areas for given applications, as compensation for the high dust loading of the media. Also, this type of collector has a tendency to be more costly because of its size requirements. The types of shaking mechanisms for such mechanical shake-down devices vary, but to the best of applicant's knowledge, the present devices do so with definite maintenance requirements that are much in excess of competitive devices such as the pulse jet and reverse jet types of dust dislodging systems.

In pulse jet collectors, high pressure air is utilized to produce high pressure air pulses in a backwash action through a venturi nozzle to inflate a row of filter bags, which in turn knocks off excess dust layers. Such systems require a high power consumption and thus increased operating costs. The pulse jet mechanism is usually controlled with electro-pneumatic components and an electrical sequential timer. The purge cycle is continuous for a given row of bags, and this is reflected in lower dust loadings of the filter media, a smaller housing, and less cost for procurement. However, there is the operating cost disadvantage as well as the maintenance cost for replacement of failed components to be dealt with.

In the reverse jet collectors, these operate in a like manner to pulse jet units except they utilize a separate, low pressure air supply as the means to cause the filter bags to inflate. Usually, the reverse jet housing is cylindrical in order to accommodate the rotary arm air blast mechanism customarily provided, which is usually pivoted at the center of the housing and travels along the inside periphery of the collector. This type of housing is more expensive to manufacture. There are rectangular reverse jet units, but they are housed in larger bodies because the reverse air mechanism requires a larger clean air plenum in which it travels across the filter bag tops. Again, the cost of the reverse jet machines is increased because of the construction and power requirements.

An object of the present invention is the provision of a mechanical shake-down mechanism that obviates the disadvantages of the earlier described systems and which operates independently of the dust collecting portion of the machine. This permits either a continuous shaking action, or a shaking action activated by pressure differential sensing mechanisms to bring it into operation whenever the static pressure differential indicates a preselected level of dust build-up, and enables the shaking action to occur without having to sacrifice any losses of efficiency due to designed timely interferences of the air flows through the filter medium.

Another object of the present invention is the provision of a mechanical shake-down mechanism for dust collectors intermittently operated automatically in response to sensing of a predetermined level of dust build-up on the filter media, in which there is no need to shutdown the entire system in order to effect the very important cleaning action of the filter bags or tubes.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a perspective view of a dust collector having a mechanical shake-down mechanism constructed in accordance with the present invention;

FIG. 2 is a vertical transverse section view taken along the line 2—2 of FIG. 1, showing some of the filter bags, with parts broken away;

FIG. 3 is a fragmentary horizontal section view through a portion of the dust collector, taken along the line 3—3 of FIG. 2;

FIG. 4 is a fragmentary section view through one of the filter bag and cage assemblies, for example taken along the line 4—4 of FIG. 2;

DETAILED DESCRIPTION OF A PREFERRED EMBODIMENT

Figure 6:
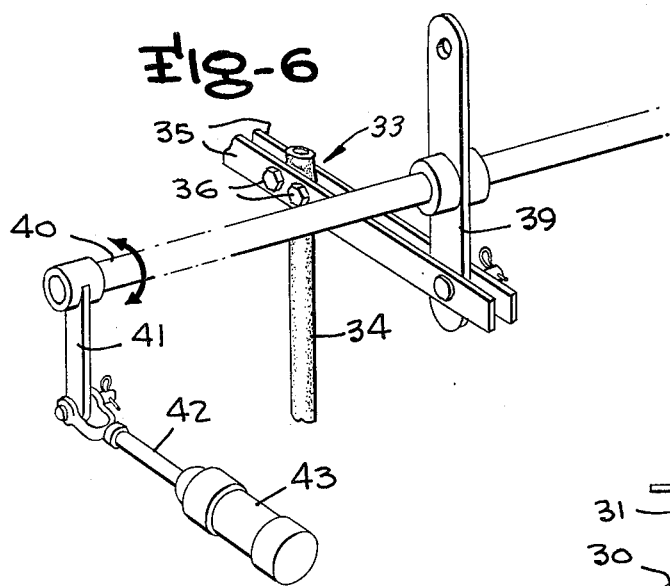
FIG. 6 is a fragmentary perspective view of portions of the mechanism for activating the rubber beater rods which depend into the filter bags and cages.

Referring to the drawings, wherein like reference characters designate corresponding parts throughout the several figures, there is illustrated in FIGS. 1 and 2 a typical dust collector apparatus, indicated generally by the reference character 10, of a representative shape and plural bag filter construction suitable for filtering air in a working environment and removing dust therefrom, which in the illustrated embodiment is in the form of a vertically elongated box-like structure supported at an elevated position by vertical standards or legs 11 and a skeleton framework 12 of metal or similar material, such as horizontal angle iron members 13 and spaced parallel vertical angle iron metal rib members 14 reinforcing vertical sidewalls 15 and a downwardly converging lower hopper portion 16 of similar sidewall and skeleton steel construction. In the preferred configuration, the section 17 between the two sets of horizontal angle iron members 13 forms a vertically elongated box-like dirty air plenum for housing the plurality of filter bags later described, and the portion 18 rising vertically above the uppermost horizontal angle iron frame members 13 forms a clean air plenum having rigid sidewalls 18a and closed at the top by a hinged access door 19 which covers the entire top of the clean air plenum 18 in the square cross-section dust collector 10 of the illustrated embodiment. In one example, the dust collector may be of square cross-section having sides each of which are 4 feet wide, with the sides 18 of the clean air plenum extending 18 inches above the uppermost horizontal angle iron frame 13 and the height of the dirty air plenum being about 10 feet 6 inches, with the height of the lower hopper section 16 being about 5 feet 4 inches and terminating in a rotary valve air lock 20 of conventional construction at its lower end. Preferably, larger units are multiples of this illustrative module, for example having side dimensions of 4 feet by 8 feet or similar enlargements in 4 foot increments. In the particular form illustrated in FIG. 1, a guard rail and platform 21 may be provided for servicing personnel.

Figure 5:
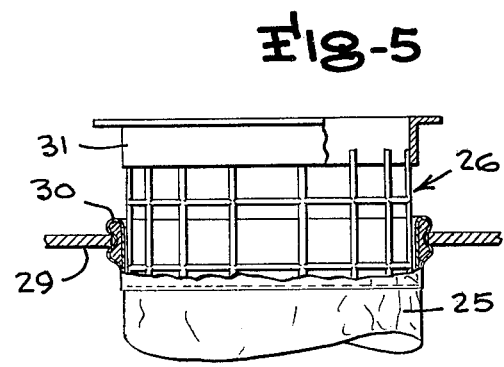
FIG. 5 is a fragmentary elevation showing the upper portion of one of the filter bags where it joins and is supported by the cage support plate, and a portion of its associated cage partially lifted out of the bag.

A conventional dirty air inlet 22 joins the side of the lower hopper section 16 for admission of dirty air into the hopper 16 and dirty air plenum section 17, and a clean air outlet 23 connects to one of the sidewalls 18a of the clean air plenum section 18 for return of filtered air to the working area or discharged to the outside of the building where the device is used for environmental protection purposes. Within the dirty air plenum 17 are a plurality of vertically elongated circular cross-section or cylindrical cloth filter bags or closed bottom filter tubes, indicated by the reference character 25 each fitted over an associated skeleton cage 26. In a preferred example, these filter bags 25 with their associated cages 26 are approximately 5 inches in diameter, of circular cross-section, and supported for example with their vertical center lines or center axes lying in parallel vertical planes spaced about 6 inches apart both in the longitudinal direction indicated by the arrow 27a and the transverse direction indicated by the arrow 27b. In one example, for a 4 foot by 4 foot dust collector, the filter bags may be arranged in seven rows of 7 bags each, providing 49 filter bags, or in the 4 foot by 8 foot example, they may be arranged in fourteen longitudinally spaced rows of 7 filter bags each spaced from each other transversely on 6 inch centers. In the illustrated example, the filter bags are supported by a cage support plate 29 welded at its edges to the uppermost rectangular angle iron frame 13 and having 5 inch diameter holes located appropriately for the filter bags described above. In this form, the cloth filter bags 25 are elongated bags of conventional filter cloth material having closed bottom and having a seam sewn into the top hem and the top hem enclosing a rubber or similar flexibly deformable grommet member 30 providing upper and lower beads which resiliently snap over and receive in the channel defined between them the confronting edge of the cage supporting plate bounding the associated opening through which the filter bag extends, as illustrated in FIG. 5, and the skeleton wire cage 26 slips inside the bag and terminates at its top in a flanged top ring member 31 which forms an abutting backup or stifener ring inwardly abutting the grommet member 30 to retain it and its supported filter bag securely mounted in the associated opening of the cage support plate 29. This provides a convenient lift-out no-clamp cage assembly permitting quick-change of filter bags without requiring special tools for changing filters.

Figure 6A:
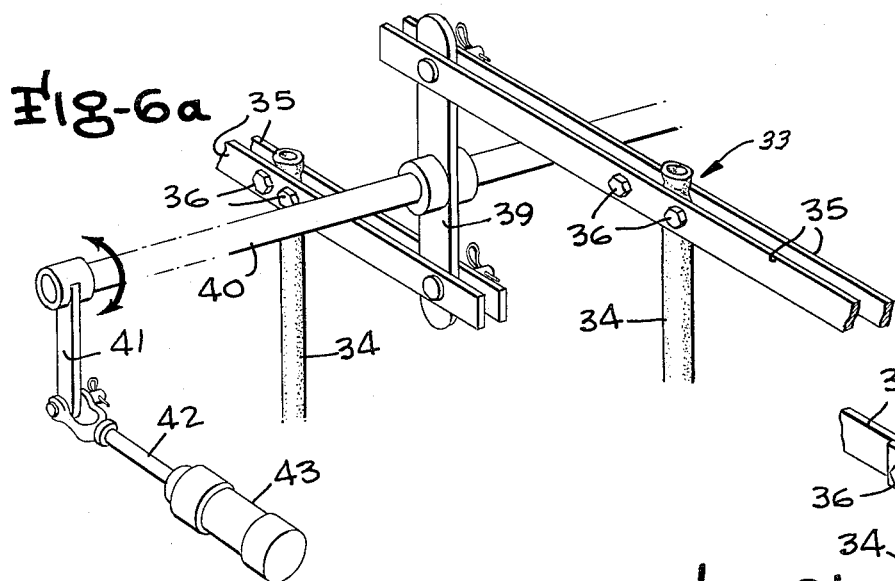
FIG. 6a is a fragmentary perspective view similar to FIG. 6 showing the clamp bar connection to the drive arms for a larger size collector.
Figure 6B:
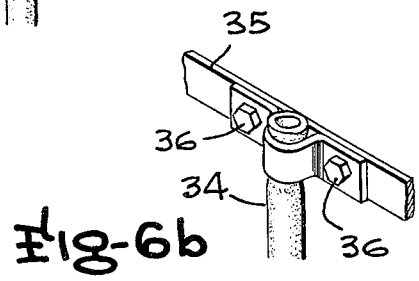
FIG. 6b is a fragmentary perspective view of an alternative arrangement for supporting the beater rods.

The mechanical shake-down mechanism of the present invention is generally illustrated by the reference character 33 and comprises a plurality of hard, resilient, elastically deformable, flexible rubber rods 34, one for each filter bag 25 and its associated cage 26, extending down into the bag cages substantially to the bottom of the filter bag, and pivotally hung at the tops of the flexible rubber rods 34 or "beaters" between closely adjacent pairs or sets of clamp bars 35 secured together by bolts 36, for example with their centers located one inch apart in flanking abutment with the associated beater rods 34 and tightened to squeeze the upper beater rod portions extending between clamp bars 35 to deform and retain them hanging from the associated clamp bar pair. Alternatively, a single bar clamp bar may be used for each row of longitudinally aligned filter bags with a U-shaped securing strap as indicated in FIG. 6b provided with mounting flanges bolted to the clamp bar and tightly encircling the upper end portion of the rubber beater rods 34 may be employed.

The clamp bars 35 in the illustrated embodiment longitudinally span each associated row of 7 filter bags 25 spaced about 5 inches above the cage support plate 29 in or very close to the vertical plane through the centers of the row of filter bags, and are supported for longitudinal back and forth movement, to impact the rubber beater rods 34 against the inside cages 26 of the filter bags 25 by back and forth movement. In the illustrated embodiment, the clamp bars 35 are movably supported near one end by hanging them from an idler arm 37, one being provided for each row of beater rods and associated clamp bars, carried on a pivoted tube or idler shaft or rod 38 journaled in suitable bushings at opposite ends in the clean air plenum sidewalls 18a, and the opposite ends of the set of clamp bars 35 are pivotally connected to drive arms 39, one for each pair of clamp bars 35, fixed on a drive shaft 40 journaled at its opposite ends in bushings in the sides 18a of the clean air plenum. The drive shaft 40 is also connected by a drive linkage arm 41 linked to the piston rod 42 of a reciprocating air cylinder 43 to impart reciprocating rotary drive to the drive shaft 40 through an appropriate angle to cause the rubber beater rods to strike the insides of the filter bag cages. In a preferred embodiment, the drive arms 39 are in the form of an elongated plate or bar which extends downwardly and upwardly equal distances from the drive shaft 40 so that the same mechanism may be used for larger dust collectors having, for example, twice the longitudinal span as the 4 foot by 4 foot size, with the drive shaft 40 and the upwardly and dowardly extending drive arms 39 located in the midregion longitudinally so that the upper portion of the shaker drive arms 39 can be connected to a similar array of clamp rods 35 extending to the left from the drive shaft 40 but otherwise similar to the array shown in FIG. 6, as shown in FIG. 6a.

The free-swinging shaker mechanism formed of the drive shaft 40 and its associated drive arms, the clamp bars 35 and idler arms therefor, and the depending rubber beater rods 34, causes the individual rubber beater rods as a free-floating mechanism powered by the air cylinder actuator 43 to strike the insides of the filter bag cages 26 and develop sufficient force to knock off any excess dust build-up on the "dirty" air side of the filter media surfaces. This is done intermittently whenever static pressure differential between the clean air side and the dirty air side increases to a preset level, activating the air cylinder 43 to reciprocate the clamp bars 35 and produce the shaking action on the rubber beater rods without interrupting the desired flow of dust-laden air and without disturbing air on the clean air side in any way. Preferably, the automatic sensing of the pressure differential is achieved by a photohelic system, for example such as the model No. 3010 photohelic sensor switch systems produced by the Dwyer Instruments, Inc. company (whose address is P.O. Box 373 Indiana 212 at U.S. 12, Michigan City, Ind. 46360), wherein photohelic sensors located at sites such as indicated at 44a and 44, sensing static pressures in the clean air plenum 18 and dirty air plenum 17, providing air static pressure signals to an adjustable meter and pressure differential switch system having a low-set point and a high-set point, to activate an electric solenoid valve in the air supply to the air cylinder 43, causing the air solenoid valve to open and allow air to flow to the air cylinder 43 to drive the shaking system drive shaft when the high-set point static pressure is detected and continue operation of the shaking system until the static pressure descends to the low-set point. Thus, when the cleaning action starts, the static pressure decreases as the bags are cleaned, and when they have been cleaned enough to allow the static pressure indicating needle to drop below the low-set point, the electrical signal to the solenoid valve is terminated, closing the air solenoid valve and stopping the air flow to the air cylinder 43.

Alternatively, the drive shaft 40 for the shaker system may be driven by an electric gear head motor (not shown) having a crank rod mechanism which merely causes the shaft 40 to oscilate back and forth about its axis to the desired angular range and cause the rubber beater rods to swing with enough action to rap the bag cages 26 with enough force to jar the dust build-up off of the outside surfaces of the bags, with the electric gear head motor controlled by conventional static pressure sensors and contacts providing a low-set point and high-set point of the type conventionally used for sensing static pressure differentials in enclosures and providing signals for operating devices while the static pressure differential exceeds desired predetermined ranges.

I claim:

1. In a plural bag dust collector filter apparatus for filtering air to remove dust and similar contaminants therefrom, the dust collector comprising a vertically elongated chamber subdivided by an apertured horizontal support plate into a lower dirty air plenum section and an upper clean air plenum section, a plurality of vertically elongated tubular cylindrical filter bags and respective associated shape-maintaining skeletal cylindrical wire cages inwardly lining the filter bags dependently supported from the supporting plate to extend therebelow along vertical axes, the filter bags and associated cages being arranged in plural longitudinal rows of filter bags whose axes lie in respective transversely spaced parallel vertical planes, the filter bags substantially spanning the height of the dirty air plenum section with the interiors of the filter bags and their cages opening upwardly through the apertures of said support plate in communication with said clean air plenum section, the improvement comprising a vertical shakedown mechanism comprising a plurality of vertically elongated beater rods, each beater rod being located respectively within and depending substantially throughout the vertical height of a respective filter bag cage and its associated filter bag and extending above said support plate, said vertically elongated beater rods being resilient, elastically deformable, rubber-like vertically elongated rods normally extending substantially along the vertical center axis of its associated cage and filter bag and having a diameter which is a small fraction of the diameter of the associated cage and filter bag, elongated supporting bars for the beater rods for each respective row of filter bags having the upper end portions of the beater rods fastened thereto in dependently supported relation, rotatable crank arms pivotally coupled to the opposite ends of the supporting bars and journaled for oscillatory rotary movement about horizontal axes within the clean air plenum section to reciprocate the supporting bars and their supported beater rods in horizontal directions to impact the beater rods carried thereby inwardly against their associated cages and develop sufficient force to dislodge dust build-up on the surfaces of the filter bags exposed to dust-laden air in the dirty air plenum section, and support bar drive means including power means coupled to said crank arms for reciprocating the crank arms and support bars to cause dust-dislodgement impacting of the beater rods against the filter bag cages.

2. A plural bag dust collector filter apparatus as defined in claim 1, wherein said apparatus includes pressure sensitive means responsive to pressure differentials between the static pressure in the clean air and dirty air plenum sections to sense when such pressure differentials exceed a predetermined level and activate said power means to reciprocate the crank arms and support bars and impact their beater rods against filter bag cages while such pressure differential exceeds said predetermined level.

* * * * *